Patented Aug. 18, 1931

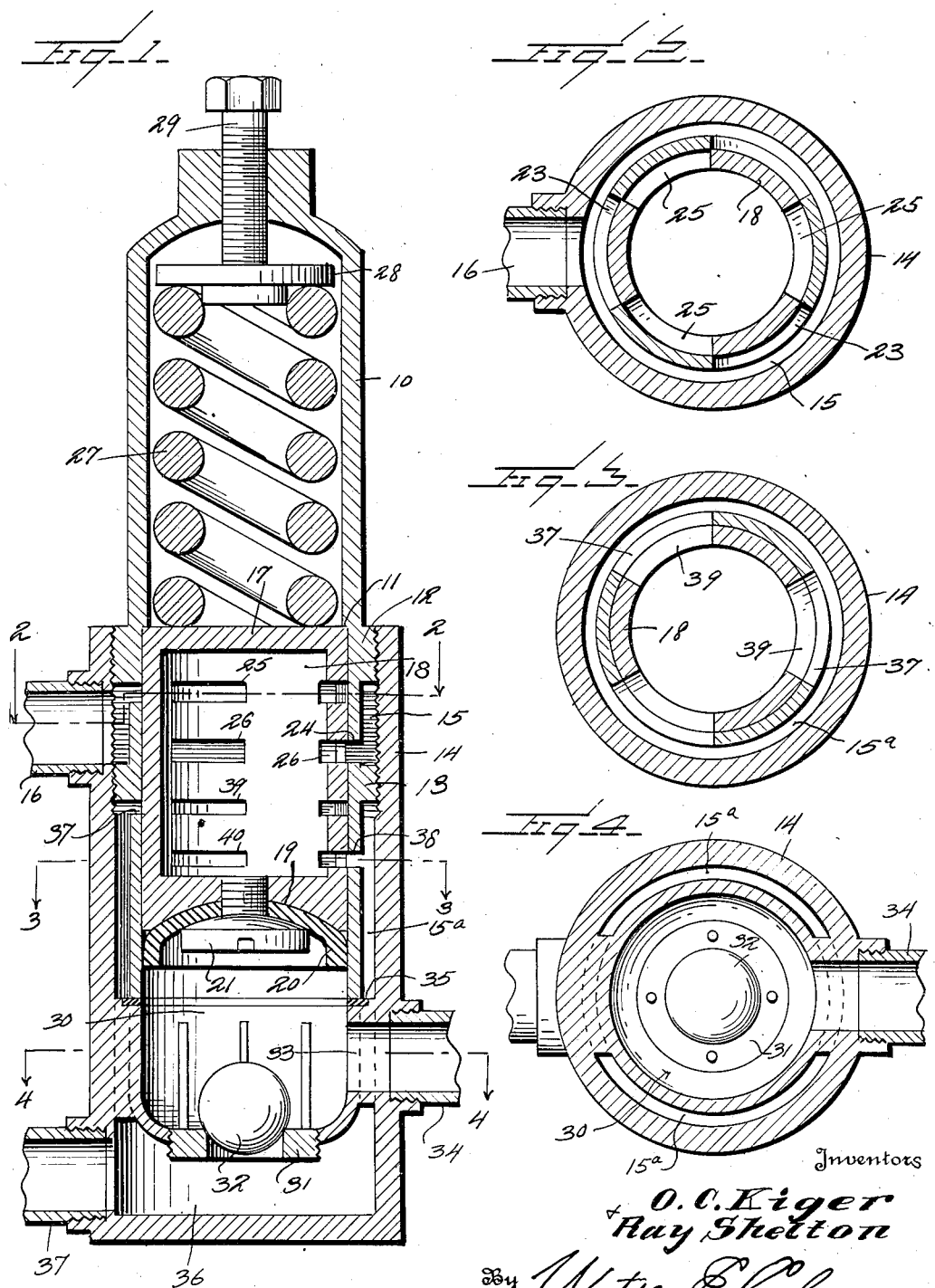

1,819,422

UNITED STATES PATENT OFFICE

OMAR C. KIGER AND RAY SHELTON, OF YAKIMA, WASHINGTON

RELIEF VALVE FOR PRESSURE PUMPS

Application filed March 27, 1930. Serial No. 439,441.

This invention relates to relief valves such as are used in pressure pumps for the purpose of relieving the pump when the pressure gets too high and particularly to certain improvements upon the relief valve patented to us on November 12, 1929, Patent No. 1,735,117.

In our prior patent, we disclosed a relief valve of a very simple and readily operated character, including in its organization a ported piston operating in a ported cylinder and so arranged that though the relief valve may rotate or turn from time to time within the cylinder, the degree of port opening at any instant will be independent of the position of the rotated valve, and further disclosed this piston valve as being urged away from its relief position by a spring having means whereby the spring might be tensioned.

The object of the present invention is to provide means to automatically relieve the pump when idling and more specifically to provide means whereby the piston may be automatically held in its relief position when the discharge pipe is closed without the pump and the power plant being under greater strain and pressure than that necessary to maintain the full circulatory flow through the pump, and to provide means whereby the moment the outlet or discharge line is opened, full operating pressure is instantly available.

Our invention is illustrated in the accompanying drawings, wherein:—

Figure 1 is a vertical sectional view through a relief valve constructed in accordance with our invention and showing the valve fully raised;

Figure 2 is a section on the line 2—2 of Figure 1;

Figure 3 is a section on the line 3—3 of Figure 1;

Figure 4 is a section on the line 4—4 of Figure 1;

Referring to these drawings, 10 designates a cylinder or valve casing which is closed at one end and open at the other and which intermediate its ends is formed with a shoulder 11. The cylinder just below this shoulder is outwardly extended as at 12 and below this shoulder 12 is outwardly extended as at 13, these outwardly extending shoulders 12 and 13 being exteriorly screw-threaded for engagement with screw-threads on the upper portion of a chamber 14 whose internal diameter is larger than the external diameter of the cylinder so that a space $15^a$ is formed between the chamber wall 14 and the exterior wall of the cylinder and so that a space 15 is formed between the shoulders 12 and 13 and between the chamber wall 14 and the exterior wall of the cylinder. From this space 15 extends the outlet pipe 16.

Disposed within the lower end of the cylinder 10 and normally below the shoulder 13 is a hollow piston valve 17 forming or defining the chamber 18. The lower end of the piston valve is concavely recessed at 19 and carries a packing cup 20 of rubber or like material, this packing cup bearing tightly against the inner face of the cylinder 10. The packing cup is held in place by a nut 21 engaging a solid shank 22 having screw-threaded engagement with a central opening at the bottom of the piston.

The cylinder 10 is formed adjacent its upper end with two rows of arcuate ports, the ports of one row being designated 23 and the ports of the other row being designated 24. It will be seen from Figures 2 and 3 that the ports 23 are staggered with relation to the ports 24 and that there are preferably three ports in each row. The piston 17 is also formed with two rows of ports 25 and 26. Each port is equal in length to the length of the ports 23 and 24, but the ports 25 and 26 are disposed in alinement, one above the other and not in staggered relation for reasons stated fully in our prior patent.

Disposed within the closed end of the cylinder 10 is a compression spring 27 which at its lower end bears against the piston and at its upper end bears against the head of a screw 29 carrying a disk 28. Thus the spring 27 may be tensioned.

So far, we have in effect described the construction which is illustrated in our prior patent except for the shoulder 13 which defines one end of the two circumferentially extending spaces 15 and $15^a$.

The lower end of the chamber 14 is formed to provide a chamber 30 carrying a valve seat 31 upon which normally rests the brass ball valve 32. A discharge port 33 opens from the chamber 30 to the discharge pipe 34. The lower end of the chamber 14 is inwardly extended to support the packing ring 35 against which the lower end of the cylinder 10 abuts. The space 15ᵃ extends downward below the lower end of the cylinder 10 as shown by dotted lines in Figure 1 and in Figure 4 and opens into the inlet chamber 36 formed beneath the valve seat 31. This inlet chamber 36 communicates with the pipe 37 leading from the pump.

The cylinder wall 10 adjacent the upper end of the space 15ᵃ is formed with two series of ports 37 and 38 disposed in staggered relation to each other in exactly the same manner that the ports 23 and 24 are disposed in staggered relation. The lower end of the hollow interior of the piston is also provided with two series of ports 39 and 40 which as illustrated are not disposed in staggered relation. The ports 39 and 40 and the ports 37 and 38 are narrower than the ports 25 and 26 and 23 and 24.

It will be seen that the purpose of staggering the ports 23 and 24 and 37 and 38 is that if the piston should be rotated so that half of the ports 23 are disclosed and half of the ports 24 are disclosed or half of the ports 37 disclosed and half of the ports 38 disclosed, the same amount of water will be discharged as if the ports 23 were fully opened and the ports 24 closed or the ports 37 opened and the ports 38 closed or vice versa. These staggered ports in the cylinder and in the piston are, therefore, provided in order to permit the piston to rotate or shift rotatively around its axis without in any way obstructing the outward passage of water. This is fully described in our previous patent before referred to.

The operation of this device is as follows:—
When the outlet pipe 34 is opened to discharge the liquid, it flows from the inlet pipe 37 into the chamber 36 and also up into the space 15ᵃ. The pressure, of course, lifts the valve 32 and the liquid passes out through the port 33 into the outlet pipe 34. If now the outlet pipe be closed, increased pressure will build up within the chambers 30, 36 and 15ᵃ. This increased pressure will force the piston up against the action of the spring 27.

When the piston has risen sufficiently, the ports 39 and 40 will come into register with ports 37 and 38 and liquid will pass from the space 15ᵃ into the hollow interior of the piston. Simultaneously ports 25 and 26 will aline with ports 23 and 24 and liquid will be discharged into the space 15 and thence through the outlet pipe 16. Simultaneously with the opening of the ports as described, the pressure in the chamber 36 will be decreased by reason of the flow through the space 15ᵃ, permitting the ball valve 32 to seat automatically. This will hold the piston valve in its raised or open position, thereby relieving the pump and power plant of all strain and pressure, except that incident to maintaining full circulatory flow through pump, that is, maintaining the flow into chamber 36 through the chambers or spaces 15ᵃ through the hollow interior of the piston and out through the outlet pipe 16, but the pump will not have to buck the pressure of the spring 27 as the piston will be held up by the liquid trapped between the lower end of the piston and the ball valve seat 32 and 31. The instant that the outlet pipe 34 is opened, however, the spring 27 will expand, forcing the piston downward, closing the ports 39 and 40 in the piston, the ports 25 and 26, however, remaining partially open, due to the fact that they are wider than the ports 39 and 40 to thus eliminate internal pressure. By means of these improvements, not only do we achieve the objects set forth in our previous patent, but the pump and the power plant are relieved of excess pressure when idling and at the same time the instant that the outlet pipe line 34 is opened, full pressure is instantly available.

While we have illustrated certain details of construction and arrangements of parts, we do not wish to be limited to these as many minor changes might be made without departing from the spirit of the invention as defined in the appended claims.

We claim:—

1. A pressure relief mechanism including a valve casing having a relief port adjacent one end, a hollow piston valve operating within the casing and having a port adapted to communicate with the relief port, the lower end of the valve casing being formed to provide a pressure inlet chamber and a valve seat, a check valve normally resting upon said seat and disposed between the inlet chamber and the piston valve, the space between said check valve and the piston valve having an outlet port, a duct communicating with the inlet chamber and extending to and communicating with the interior of the casing by a port, the piston valve having a port adapted to communicate with said last named port when the piston is shifted to a position where the first named port of the piston communicates with the relief port, and means urging the piston into a position where said ports are out of register with each other.

2. A pressure relief mechanism including a cylindrical valve casing having two circumferentially extending chambers, each communicating by a series of ports with the interior of the casing, one of said chambers having a relief port leading therefrom, one end of the casing having an inlet chamber separated from the main body of the interior of the casing by a valve seat, a gravity actuated check valve normally resting upon said seat. the inlet chamber having a pressure inlet port, and the space in said cylinder on the other side of said seat from the inlet chamber having an outlet port, the inlet chamber having a duct communicating with that circumferentially extending chamber which is not provided with the relief port, and a piston valve disposed in the casing and urged toward said check valve, the piston valve having ports therein adapted when the piston valve is forced away from the check valve by pressure building up in the space behind the piston valve to register with the ports in the valve casing.

In testimony whereof we hereunto affix our signatures.

OMAR C. KIGER.
RAY SHELTON.